Patented July 15, 1941

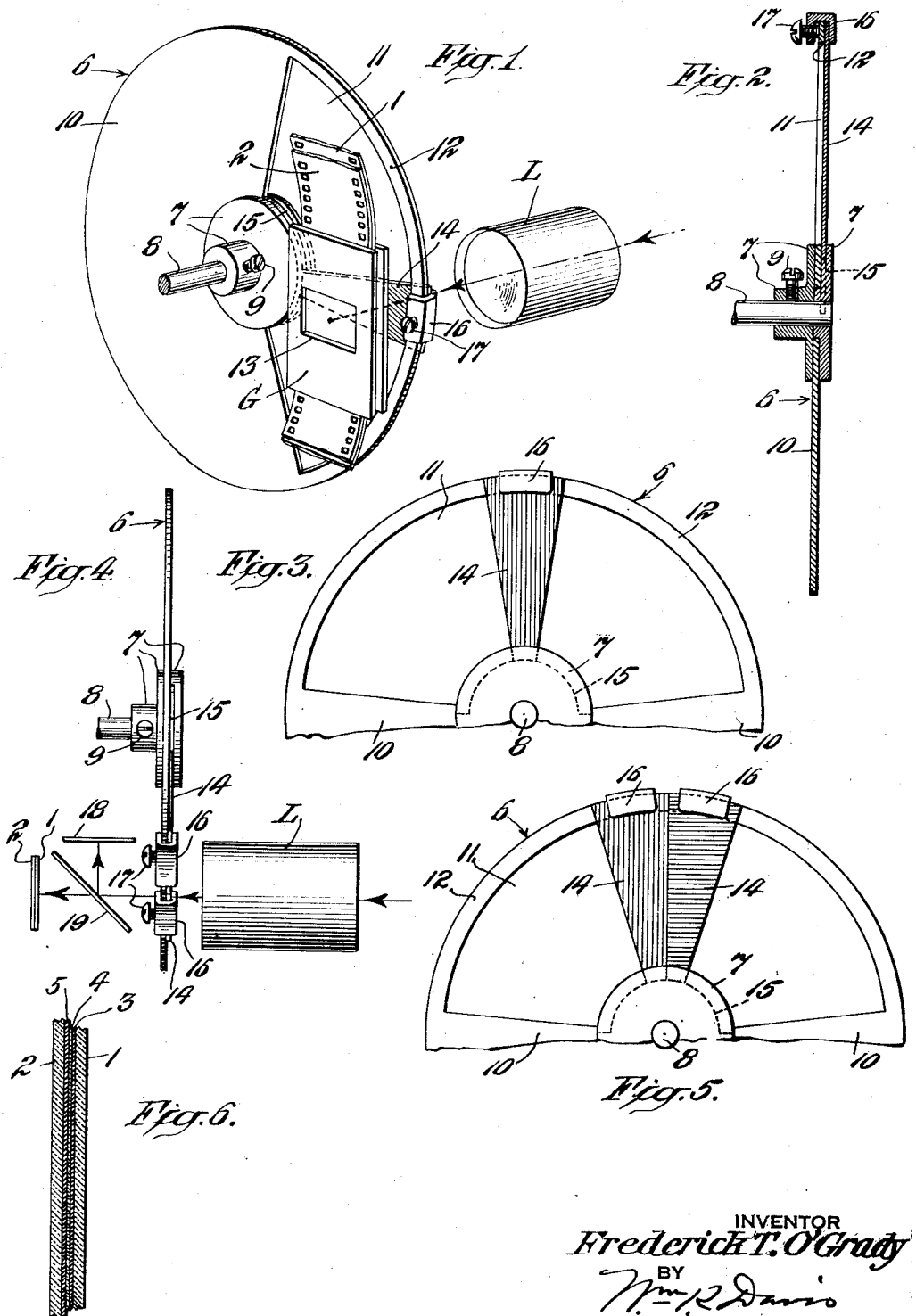

2,249,032

UNITED STATES PATENT OFFICE 2,249,032

COLOR PHOTOGRAPHY

Frederick T. O'Grady, Flushing, N. Y.

Application November 30, 1938, Serial No. 243,069

9 Claims. (Cl. 88—16.4)

This invention relates more particularly to improvements in the art of color motion picture photography wherein negative photographic records are made of the different colors of an object or scene photographed.

In certain well-known, commercial methods of color photography it is difficult and often impossible to obtain balanced negative recording of the different colors photographed. Often one color record predominates and the effect of that predominance is carried through the printing and the projection of the pictures so that upon a viewing screen one color, say red for example, predominates in the projected image. The said off-balance negative recording is due to different degrees of sensitivity of the negative emulsions to different colors and is due also to varying lighting conditions under which the exposures are made.

Important objects of the present invention are, to provide a simple and satisfactory method for correcting said off-balance negative recording of different colors, and to provide extremely simple, inexpensive and satisfactory means for carrying out said method.

Other objects of the invention will appear hereinafter.

In the drawing,

Fig. 1 is a perspective view showing an improved shutter and color filter device operatively associated with a bipack motion picture film combination and a lens unit, for performing the improved method;

Fig. 2 is a diametrical sectional view of the shutter and filter device;

Fig. 3 is a fragmentary face view of the shutter disk equipped with a filter of a different color;

Fig. 4 is a diagrammatic plan view illustrating the adaptation of the invention to a three-color photographic process;

Fig. 5 is a fragmentary face view of the shutter and filter device as employed in said three-color process; and Fig. 6 is an enlarged sectional view of a portion of a bipack film combination.

The invention is disclosed in connection with a photographic process employing multipack negative film. In such a process it has been impossible heretofore to correct off-balance recording of different colors owing to the fact that the films are arranged one behind another for simultaneous exposure to a common exposure light flux. Employment of the invention in connection with bipack film will be first described.

As shown in Figs. 1 and 6 a bipack film combination includes a front film 1 and a back film 2. Film 1 bears upon its rear face a coating 3 of monochromatic emulsion responsive to green light for recording that color of the object or scene photographed. Overlying the coating 3 there is a red transparent filter coating 4. Film 2 bears upon its front face a coating 5 of panchromatic emulsion. At the film gate the films are disposed with the coating 5 of the rear film in facing the coating 3 of the front film with the red filter coating 4 between and in contact therewith. When an exposure is made of an object or scene containing red and green, or colors approaching thereto, a photographic record of the green portion of the scene will be made upon the film 1 since the coating 3 is responsive to green light. Upon the back film 2 there is made, by the exposure, a photographic record of the red portion of the scene. The light for the latter record must pass through the front film 1 and its coatings, and the red filter coating 5 restricts the recording to red. Due to different sensitivity of the emulsions 3 and 5 and due also to lighting conditions of the scene photographed it is quite common for one of the films to receive a more dense exposure than the other so that when the color records are printed and projected one color will be over accentuated upon the viewing screen. Red is a frequent offender in this respect.

My invention is directed to the prevention of the said objectionable predominance of one color over another by provision for obtaining balanced color records upon the negative films. During the exposure of the bipack films 1 and 2 I propose to subject the exposure light flux to the action of a light filter in a manner to limit exposure upon one of the films without appreciably affecting exposure upon the companion film. For that purpose there is provided an improved camera shutter and color filter device. Said device comprises a disk 6 having a hub 7 adjustably fixed to a driving shaft 8 by a set screw 9. The disk has an opaque shutter area 10 and a segmental exposure aperture 11, a rim portion 12 of the disk defining the outer side of said aperture. The disk extends between the film gate G and the lens unit L of a camera and is driven in the usual manner to pass the shutter area 10 across the aperture 13 of the film gate during the periods of film advance and to expose the picture areas or "frames" of the films through the aperture 11 when the films are at rest, with a frame in register with the aperture 13. A supplemental color filter 14 is removably and adjustably mounted upon the disk and extends radially across the aperture 11. In the present instance the exposure aperture is a hole in the disk. The disk may, however, have a transparent portion forming said aperture.

The filter 14 comprises a segmental strip or blade of celluloid or other suitable transparent or translucent material. The width of the strip is materially less than the circumferential width of the exposure aperture 11. For mounting the strip the hub of the disk is formed with a peripheral groove 15 to receive the inner end margin of the strip. The outer end margin of the strip is secured to the disk by means of a clip 16, U-shaped in cross section to straddle the rim portion 12 of the disk and said margin of the strip. One leg of the clip bears a set screw 17 to engage one face of the rim 12 and draw the other leg of the clip inward to clamp the strip to the opposite face of the rim. The mounting of the strip enables it to be adjusted around the axis of the disk to any desired position across the aperture 11 and also enables it to be easily removed and replaced. Said mounting will also permit variations in the width of the strip.

In the photographing operation a few test exposures are first made upon the bipack films without employment of the color filter 14, and the films are then examined for comparison of their color exposures. To assist in this comparison a neutral gray or white object may be placed in the scene to be photographed. Then, by comparing the exposures of said object upon the different films, the operator of the camera can detect excess exposure upon either film. If the exposure upon film 2, receiving the red color records, is more dense than the exposure upon film 1, receiving the green color records, preparation is made for balancing the exposures by applying to the disk 6 a green color filter 14. The width of this filter should be gauged according to the required reduction in exposure upon the film 2.

Having applied the filter 14 to the disk, photographing of the scene is resumed. During each exposure period the supplemental color filter will cut across the exposure light flux, leading from the scene to the films, through the lens unit L. Since the color filter is green, or complementary to red, some of the red rays in the exposure light flux will be absorbed or obstructed by the filter to prevent their passage to film 2. Thereby the recording of red upon said film will be limited. At the same time the green filter will permit substantially free passage of green rays to the film 1 so that the recording of green thereon will not be appreciably reduced. Balanced color records upon the two negative films will be thereby obtained with the result that when the pictures are printed and projected by well-known processes the colors upon the viewing screen will have their proper values.

If it is found upon inspection of the test exposures that the density of exposure upon the film 1 exceeds that upon the film 2 a supplemental red color filter is applied to the shutter disk, as shown in Fig. 3, instead of a green one. This red filter will absorb or obstruct the passage of complementary green rays to the film 1 whose emulsion records green. At the same time it will permit the passage of red rays to film 2 for substantially undiminished recording of red upon said film through the operation of the primary or main color-selecting and recording means which is being used and which is complete in itself, and its effect only is modified by the supplemental filter.

As the width of the color filter strip is materially less than the width of the exposure aperture, around the axis of the shutter disk, the filter will act upon the exposure light flux during a portion only of the exposure period. The duration of the filter action may be regulated in accordance with requirements for correcting off-balance color exposure by employment of a filter strip of greater or less width.

Fig. 4 illustrates employment of the invention in connection with a three-color photographing process. There a third negative film 18 is disposed in an offset plane at right angles to the planes of the films 1 and 2. This film may bear an emulsion for recording blue, for example. A transparent reflecting plate 19, obliquely arranged, reflects exposure rays to film 18 and also permits passage of rays to the films 1 and 2 for making exposures upon the three films. If, upon inspection and comparison of test exposures upon the three films, it is found, for example, that the exposures upon the films 1 and 2 are more dense than those upon the film 18, two color filters 14 may be applied to the shutter disk to reduce exposure upon the films 1 and 2 for balancing with the exposure upon film 18. In Fig. 5 a red filter and a blue filter are shown applied to the disk. The red filter will reduce green exposure upon the film 1 and the blue filter will reduce red exposure upon the film 2 while permitting the passage of blue rays to the film 18 for recording thereon. By proper choice of size and density for the red filter its effect upon the exposure on film 18 can be regulated so that the blue exposure will not be objectionably affected. It is also possible by choice of filters of proper colors, sizes and densities, to limit exposure upon any one or any two of the three films relatively to the others. For examples, a yellow filter may be employed to reduce exposure upon the film 18 without objectionably affecting exposure upon the films 1 and 2, and a yellow filter and a blue filter may be employed to limit exposure upon the films 2 and 18 without objectionably affecting exposure upon the film 1.

The invention is capable of satisfactory employment in connection with other photographing processes as, for example, the well-known "screen-color" process as exemplified by the Dufaycolor and Finlaychrome processes. In such a process the negative film directly bears minute color filters in the form of dots, squares or grains. By the employment of such a film there are obtained simultaneously a plurality of different exposures each broken up into minute parts interspersed with the parts of the other exposure, or exposures, upon a common film surface, the different exposures being records of the different colors in the scene photographed. By employment of my correcting color filters, as described, the different color records may be properly balanced upon such a film. The invention is also capable of satisfactory employment in connection with a process disclosed in the U. S. Patent No. 1,978,789 issued to Otto Gilmore. In that process two color selective images are obtained simultaneously within a single standard picture frame by a single lens and a prismatic beam-splitting device. For balanced color recording in such a process my color filter means may be disposed either between said beam-splitting device and the film or in advance of the beam-splitting device.

In the preferred application of the invention the color-balancing filter is used in addition to the primary or main-color selecting and negative recording means in whatever system of color photography is used without any change in that system, and merely modifies the effect of said main or primary color producing means.

While the invention is shown and described in connection with motion picture photography it is obviously adaptable for employment in "still" photography.

What I claim is:

1. The method of correcting off-balance negative recording of different colors in color photography comprising photographically recording simultaneously, by a single negative exposure to a color light flux from a scene to be photographed, a plurality of complementary color records of the scene by means of a main color ray separating and recording means to produce a plurality of complete color records, and limiting the recording of one of said colors by subjecting the said single exposure light flux to an additional supplementary color filtering action during a portion only of the exposure period by interposing in said light flux during said single exposure an additional secondary light filter of a color to obstruct the passage of light rays of said one of said plurality of colors during a portion only of the exposure period and permit the passage during the entire exposure period of light rays of another of said plurality of colors, to thereby reduce the time period during which light rays of the color obstructed by said additional secondary filter means will pass during the single exposure period, to secure a selected color balance in the color records of the scene photographed.

2. The method of correcting off-balance negative recording of different colors in color photography comprising photographically recording simultaneously, by a single negative exposure to a color light flux from a scene to be photographed, a plurality of complementary color records of the scene on a plurality of negative bases prepared for photographic recording of one color record of the scene upon one base and a complementary color record of the scene on the other base by means of a main color ray separating means, and limiting the recording of one of said colors by subjecting the said single exposure light flux to an additional supplementary color filtering action during a portion only of the exposure period by interposing in said light flux during said single exposure an additional secondary light filter of a color to obstruct the passage of light rays of said one of said plurality of complementary colors during a portion only of the exposure period and permit the passage during the entire exposure period of light rays of another of said plurality of complementary colors to thereby reduce the time period during which light rays of the color obstructed by said additional secondary filter means will pass during the single exposure period, to secure a selected color balance in the color records of the scene photographed on the negative bases.

3. The method of balancing color records in color photography, comprising photographically recording simultaneously by negative exposure of a plurality of color sensitive films through suitable main or primary color separating means to obtain a plurality of different color records of a scene by a single exposure, and limiting the recording of one of said colors by subjecting the exposure light flux for recording the plurality of color records to an additional secondary color-filtering action during a portion only of the exposure period by interposing in said light flux during the said single exposure said secondary filter of a color chosen to obstruct the passage of light rays of one of said plurality of colors and permit the passage during the entire exposure period of light rays of another of said plurality of colors, to thereby reduce the time period during which said color-sensitive films will be subjected to light rays of the color obstructed during a portion only of the exposure period by said additional secondary filter means to effect a selected color balance on the exposed color sensitive films.

4. The method of balancing color records in color photography, comprising photographically recording simultaneously by negative exposure of a plurality of color sensitive films through suitable main or primary color separating means to obtain a plurality of different color records of a scene by a single exposure, and limiting the recording of one of said colors by subjecting the exposure light flux for recording the plurality of color records to an additional secondary color-filtering action during a portion only of the exposure period by interposing in said light flux during the said single exposure said secondary filter of a color chosen to obstruct the passage of light rays of one of said plurality of colors and permit the passage during the entire exposure period of light rays of another of said plurality of colors and regulating the duration of said secondary filtering action, to thereby reduce the time period during which said color-sensitive films will be subjected to light rays of the color obstructed during a portion only of the exposure period by said additional secondary filter means to effect a selected color balance on the exposed color sensitive films.

5. The method of balancing color records in color photography, comprising photographically recording simultaneously by negative exposure of a plurality of color sensitive films through suitable main or primary color separating means to obtain a plurality of different color records of a scene by a single exposure, and limiting the recording of one of said colors by subjecting the exposure light flux for recording the plurality of color records to an additional secondary color-filtering action during a portion only of the exposure period by interposing in said light flux during the said single exposure said secondary filter of a color chosen to obstruct the passage of light rays of one of said plurality of colors and permit the passage during the entire exposure period of light rays of another of said plurality of colors and varying the width of said secondary filter to regulate the duration of said secondary filtering action, to thereby reduce the time period during which said color-sensitive films will be subjected to light rays of the color obstructed during a portion only of the exposure period by said additional secondary filter means to effect a selected color balance on the exposed color sensitive films.

6. The method of balancing color records in color photography, comprising photographically recording simultaneously by negative exposure to a common light flux of a plurality of complementary color sensitive films through suitable main or primary complementary color filtering means to obtain a plurality of different color records of a scene by a single exposure, and limiting the recording of one of said colors by subjecting the exposure light flux for recording the plurality of color records to an additional secondary color filter of a color complementary to one of said plurality of colors during a portion only of the exposure period by passing across said light flux during the said single exposure said secondary filter of a complementary color chosen to obstruct the passage of light rays of one of said plurality of colors and permit the passage of light rays of another of said plurality of colors, to thereby reduce the time period during which said color-sensitive films will be subjected to light rays of the color obstructed during a portion only of the exposure period by said additional secondary filter means to effect a selected color balance on the exposed color sensitive films.

7. The method of balancing color records in color photography, comprising photographically recording simultaneously by exposure to a common light flux of a plurality of negative motion picture films prepared for photographic recording of one color of the scene upon one film and another color of the scene upon the other film by a single exposure through suitable main or primary color separating means, and limiting the recording of one of said colors upon one of said films by subjecting the exposure light flux for making the exposure on both of said films to an additional secondary color-filtering action during a portion only of the exposure period by interposing in said light flux during the said single exposure a secondary filter of a color chosen to obstruct the passage of light rays recordable on one of said films and permit the passage of light rays of a color recordable on the other of said films, to thereby reduce the time period during which said color-sensitive films will be subjected to light rays of the color obstructed during a portion only of the exposure period by said additional secondary filter means to effect a selected color balance on the exposed color sensitive films.

8. The method of color motion picture photography, comprising simultaneously exposing to a common exposure light flux from a scene to be photographed a pack of bi-pack negative motion picture films in face-to-face relation with a color filter between and one prepared for recording one color and the other prepared for recording a complementary color, and limiting the recording of one of said colors upon its respective film by subjecting the exposure light flux for making the exposures upon both films to a secondary color-filtering action during a portion only of the exposure period by interposing in said light flux a color filter of an area sufficient to obstruct only a portion of the light rays passing to the films and of a color complementary to said one of the colors whose recording is to be limited.

9. The method of balancing color records in color photography, comprising photographically recording simultaneously by exposure to a common light flux three negative motion picture films prepared for photographic recording of one color of the scene upon one film, another color of the scene upon one of the other films and a third color of the scene upon the other film, by a single exposure through suitable main or primary color ray separating means, and limiting the recording of said colors upon a pair of said films by subjecting the exposure light flux for making the exposure on all of said films to an additional secondary color-filter action during a portion only of the exposure period by passing across said light flux in succession during the said single exposure a plurality of secondary filters one of a color chosen to obstruct the passage of light rays recordable on one of the films of said pair and the other of a color chosen to obstruct the passage of light rays recordable on the other film of said pair, said secondary filters permitting the passage of light rays of a color recordable on the other of said films, to thereby reduce the time period during which said color-sensitive films will be subjected to light rays of the colors obstructed during a portion only of the exposure period by said additional secondary filter means to effect a selected color balance on the exposed color sensitive films.

FREDERICK T. O'GRADY.